United States Patent
Moroto et al.

[11] Patent Number: 5,697,466
[45] Date of Patent: Dec. 16, 1997

[54] HYBRID VEHICLE

[75] Inventors: Shuzo Moroto; Mutsumi Kawamoto; Kozo Yamaguchi; Shigeo Tuzuki; Yoshinori Miyaishi, all of Aichi-ken, Japan

[73] Assignee: Kabushikikaisha Equos Research, Japan

[21] Appl. No.: 149,806

[22] Filed: Nov. 10, 1993

[30] Foreign Application Priority Data

Nov. 12, 1992 [JP] Japan .................. 4-302675

[51] Int. Cl.⁶ .................................................. B60K 6/02
[52] U.S. Cl. ................ 180/65.2; 180/65.8; 364/424.026; 364/424.085
[58] Field of Search .................... 180/65.2, 65.8, 180/178, 179, 65.3, 65.4; 364/424.01, 424.03, 424.026, 424.084, 424.085

[56] References Cited

U.S. PATENT DOCUMENTS

| | | | |
|---|---|---|---|
| 4,305,254 | 12/1981 | Kawakatsu et al. | 180/65.2 X |
| 4,313,080 | 1/1982 | Park | 180/65.2 X |
| 4,335,429 | 6/1982 | Kawakatsu | 180/65.2 X |
| 4,470,476 | 9/1984 | Hunt | 180/65.2 |
| 4,533,011 | 8/1985 | Heidemeyer et al. | 180/65.2 |
| 5,117,931 | 6/1992 | Nishida | 180/65.2 |
| 5,176,213 | 1/1993 | Kawi et al. | 180/65.2 X |
| 5,343,970 | 9/1994 | Severinsky | 180/65.2 |

FOREIGN PATENT DOCUMENTS 59-204402  5/1987  Japan .

*Primary Examiner*—Eric D. Culbreth
*Assistant Examiner*—Michael Mar
*Attorney, Agent, or Firm*—Lorusso & Loud

[57] ABSTRACT

A hybrid vehicle maintains its travel even if the motor driving system used therein suddenly encounters some problem in operation. The hybrid vehicle has an internal combustion engine and an electric motor with its output connected to an output axle. A clutch is provided to selectively connect the internal combustion engine to the output axle and a hydraulic power transmission is provided between the clutch and the internal combustion engine. A drive power share computer apportions the needed drive power between the engine and the motor. A detector is provided for detecting a malfunction of the motor. A first controller serves to release the clutch when the vehicle is running in a motor drive mode and a second controller effects engagement of the clutch and driving with the engine, even when the vehicle is a motor drive mode, when the detector detects a malfunction of the motor.

22 Claims, 11 Drawing Sheets

HYBRID VEHICLE

BACKGROUND OF THE INVENTION

1. Field of the Invention

This invention relates to a hybrid vehicle.

2. Description of the Related Art

A general use vehicle conventionally has an internal combustion engine using gasoline to rotate driving wheels via an transmission unit, either automatic or manual, wherein the rotational speed of the engine is changed as demanded. The internal combustion engine naturally burns a mixed gas consisting of gasoline and air to obtain torque energy, thereby generating noise and exhaust gas, both detrimental to the environment.

An electric vehicle, using an electric motor instead of the above-mentioned internal combustion engine, eliminates the above-mentioned noise and exhaust gas. The electric vehicle carries the electric motor accompanied by a battery to rotate the driving wheels without noise or exhaust gas. However, an electric vehicle having a limited travel distance on one battery charge is of no practical use. Accordingly, a hybrid vehicle wherein both the internal combustion engine and the electric motor are effectively used has been proposed (see, Japanese Patent Laid-open No. Sho 59-20442 and U.S. Pat. No. 4,533,011).

However, when a motor driving system, essentially consisting of the electric motor and the battery, develops trouble in one of the hybrid vehicles referred to above, the vehicle can not depend upon the electric motor for travel. Such trouble may occur when the electric current is supplied to the coil in the electric motor becomes so excessive that the copper wire and iron core generate heat and electrical resistance thereby increases in the copper wire.

FIG. 16 shows a correlation between the temperature and the resistance in copper wire. A temperature hike from t1 to t2 in the copper wire used in the electric motor results in an increase of the electric resistance from R1 to R2 as shown, thus rendering the motor ineffective because of energy losses resulting from heat generation and melting of the coating of the wire to short-circuit or break down the motor.

The electric motor used in the conventional hybrid vehicle also stops operation when electric power stored in the battery (hereinafter referred to as "battery residual charge") is completely consumed.

An object of the present invention is to provide an improved hybrid vehicle which continues travelling comfortably, so as to overcome the disadvantages in the conventional hybrid vehicle, even if the motor driving system used therein suddenly develops some problem in operation.

SUMMARY OF THE INVENTION

To attain the above objective, the present invention provides an improved hybrid vehicle having an internal combustion engine and an electric motor with its output connected to an output axle. A clutch selectively connects the internal combustion engine to the output axle and a hydraulic power transmission is provided between the clutch and the internal combustion engine. A drive power share computing means apportions the drive power between the engine and the motor and is responsive to a signal from detecting means for detecting a malfunction of the motor. A first control means releases the clutch when the vehicle is driven by the motor and a second control means effects engagement of the clutch for driving by the engine even when the vehicle is running with power from the motor when the detecting means detects a malfunction of the motor.

The hybrid vehicle may also have a third control means for interrupting the motor during the driving state thereof when the detecting means detects a malfunction of the motor.

Incidentally, the malfunction state may originate either in the motor in a low electrical residual charge of the battery or in the motor drive assembly for the motor.

The output axle can be provided with a transmission unit after the motor.

The hydraulic power transmission can be a torque convertor including a pump impeller, a turbine runner and a stator.

The hydraulic power transmission may further have a lock-up clutch for a direct connection of the input and output shafts.

The drive power share computing means is adapted to operate responsive to travelling speed and degree of throttle opening.

Still other objects and advantages of the present invention will become readily apparent to those skilled in this art from the following detailed description, wherein only the preferred embodiments of the invention are shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT(S)

The most preferred embodiment of the present invention will now be described with reference to the drawings.

Figure 1:
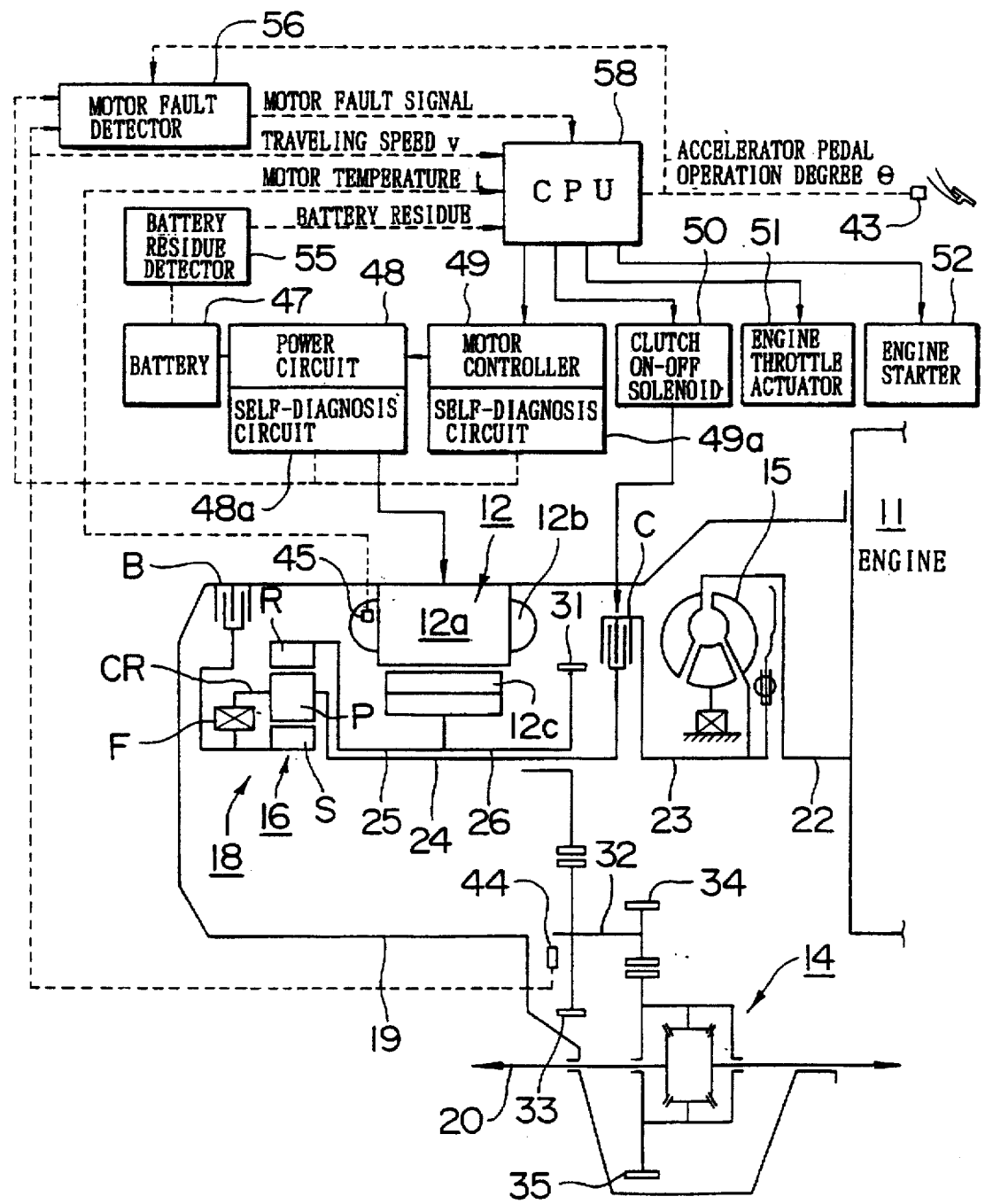
FIG. 1 is a schematic diagram of one embodiment of the present invention.

FIG. 1 is a schematic and block diagram of the entire first embodiment of the present invention. It should be understood that some structural elements are explained in connection with latter embodiments.

At the beginning of the detailed description of the preferred embodiments, a train system in a hybrid vehicle will be explained, as is used in all of the embodiments described in the present application.

In the drawing, the reference numeral 11 is an internal combustion engine which is selectively operated, 12 is an electric motor which is selectively operated, 14 is a differential gear unit, 15 is a torque convertor used as a hydraulic power transmission, C is a clutch rotating into engagement with the internal combustion engine 11, and 16 is a planetary gear unit. The planetary gear unit 16 is a single planetary type gear unit comprising a ring gear R, a pinion P, a sun gear S, and a carrier CR carrying the pinion P. B is a brake selectively meshing with the sun gear S and F is a one-way clutch. The planetary gear unit 16, the brake B and the one-way clutch F define a transmission unit 18.

The reference numeral 19 indicates a driving unit case in which the electric motor 12, the differential gear unit 14, the torque convertor 15, the clutch C, and the transmission unit 18 are all housed together. The reference numeral 20 indicates a drive shaft for transmitting rotation at a reduced speed through the differential gear unit 14 to one driving wheel.

The torque convertor 15 is defined by a pump impeller directly connected to an output shaft 22 extending from the engine 11, a turbine runner connected to an output shaft 23, a stator located intermediate the pump impeller and the turbine runner, and a lock-up clutch arranged to rotate concurrently with the turbine runner. When the operation of the lock-up clutch couples the wall of the case with the output shaft 22 via a frictional material, the two shafts 22 and 23 rotate integrally. Otherwise, when the lock-up clutch is released, the torque convertor 15 functions as a conventional torque convertor to transmit rotational power in accordance with relative rotation between the pump impeller and the turbine runner. The lock-up clutch is essentially maintained in its engaged state continuously to prevent power loss due to slip in the convertor except when the clutch C is activated to connect the engine 11 and the electric motor 12.

Numeral 24 indicates an input shaft for the transmission unit 18, 25 is an output shaft for the transmission unit 18 and 26 is an output shaft for the electric motor 12. The output shaft 26 is arranged to rotate concurrently with the output shaft 25.

It can be seen from the drawing that the electric motor 12 is defined by a magneto stator 12a fixed on the driving unit case 19, a stator coil 12b wound around the magneto stator 12a and a rotor 12c connected with the output shaft 26. As the stator coil 12b receives the electrical power, the rotor 12c begins to rotate.

The rotational power generated by the internal combustion engine 11 and the electric motor 12 is transferred to a counter drive gear 31.

In parallel with the output shaft 26, is a counter drive shaft 32 which carries a counter driven gear 33 meshing with the counter drive gear 31 so as to transmit the rotation of the counter drive gear 31 to an output gear 34.

The rotation of the output gear 34 causes rotation of a large output gear 35 engaged by the gear 34. As can be seen from the drawing, the number of teeth of the gear 35 is greater than the number of teeth of the gear 34 to provide a final speed reduction. The rotation of the gear 35 is further transmitted to the differential gear unit 14 to rotate the two drive shafts 20 laterally extending therefrom in opposite directions.

As has been mentioned above, in the hybrid vehicle according to the present invention, there are three possible modes for powering the vehicle, the first one being an engine drive mode in which the vehicle runs only by means of the internal combustion engine 11, the second one being an electric motor drive mode in which the vehicle runs only by means of the electric motor 12 and the third one being an engine/motor drive mode in which the engine 11 and the motor 12 are used together.

When the vehicle is driven by means of the internal combustion engine in the engine drive mode, the rotational power of the engine 11 is transmitted to the torque convertor 15 via the output shaft 22 and further transmitted to the clutch C via the output shaft 23. As the clutch C is engaged, the rotation of the output shaft 23 is transmitted to the carrier CR in the planetary gear unit 16 via the input shaft 24.

In the planetary gear unit 16, as the brake B is released, the one-way clutch F is locked up by the rotation of the carrier CR whereby the rotation of the input shaft 24 is directly forwarded to the output shafts 25 and 26. When the brake B is engaged, the sun gear S stops its rotation, so that accelerated rotation speed from the ring gear R to the output shafts 25, 26 is generated to rotate the counter drive gear 31.

The rotating counter drive gear 31 rotationally drives the counter drive shaft 32 via the counter driven gear 33. Then, the rotation of the shaft 32 is finally transmitted to the final speed reduction system defined by the output gear 34 and the large output gear 35 to move the vehicle at a controlled speed. In this state, the hybrid vehicle is run by only the power generated by the internal combustion engine.

Next, in the motor drive mode without using the engine 11, the torque generated by the motor 12 is transferred to the counter drive gear 31 via the output axle 26. In this state, the hybrid vehicle according to the present invention is moved only by the electric motor 12.

When the vehicle is in the engine/motor drive mode wherein both the engine 11 and the motor 12 are operated and the clutch C is activated, the vehicle can start and keeps moving, even when the motor 12 and a motor controller 49 develop trouble, by power from the internal combustion engine.

As has been mentioned, there are three modes, that is the engine drive mode, the motor drive mode and the engine/motor drive mode, which are selected in a central processing unit (CPU) 58 according to circumstances. Generally, as the travelling speed v is low and the degree of accelerator pedal operation θ is also low, the vehicle moves in the motor drive mode. When the speed v is high and the degree of accelerator pedal operation degree θ is low, the vehicle moves in the engine drive mode. And when the speed v is low and the degree of accelerator pedal operation θ is high, the vehicle moves in the engine/motor drive mode. The CPU has memories such as RAM and ROM, the ROM being used to store several drive mode maps defining running ranges for the respective drive modes.

If the motor drive assembly defined by the motor 12, battery 47, power circuit 48 and motor controller 49 malfunctions due to some reason, the vehicle can not continue to move in the motor drive mode. Such a problem tends to occur when the magneto stator 12a is abnormally heated and the electrical resistance in the copper wire increases as excessive electric power is supplied to the stator coil 12b to operate the motor 12 to comply with a heavy duty travel demand.

The generation of heat is increased, so that the coating of the wire melts to thereby cause a short-circuit in the motor 12. The excessive heat generation means an energy loss for the motor 12, that is the torque is decreased and the stator coil 12b could burn. As the motor 12 malfunctions due to such problems, the vehicle can no longer move in the motor drive mode.

As will be understood with reference to the associated drawings, upon detection of a malfunction in the motor drive assembly, running range for the engine drive mode is expanded toward a low speed area in the drive mode map. In order to so alter the running range, the CPU 58 collects the results of the degree of accelerator pedal operation θ detected by the accelerator sensor 43, the travelling speed v detected by a speed sensor 44 provided at the counter drive shaft 32, and the motor temperature t detected by a temperature sensor 45 fixed at the stator coil 12b. Alternatively, the motor temperature t can be measured at the vicinity of the magneto stator 12a in the driving unit case or by sensing temperature of a cooling oil utilized for the motor 12 instead of monitoring the stator coil 12b temperature.

In the drawings, the reference numeral 47 indicates the battery, 48 is a power circuit for supplying electric power to the motor 12, 48a is a self-diagnosis circuit which is provided in the power circuit 48 and adapted to diagnose the same and which comprises several diagnostic circuits, 49 is a motor controller controlling the power circuit 48 responsive to signals from the CPU 58, and 49a is a self-diagnosis circuit which is provided in the motor controller 49 and adapted to diagnose the same and which comprises several diagnostic circuits. The reference numeral 50 indicates a clutch on-off solenoid for operating the clutch C responsive to signals from the CPU 58, 51 is an engine throttle actuator regulating throttle opening responsive to signals from the CPU 58, and 52 is an engine starter for starting the engine 11 upon receiving a signal from the CPU 58.

Figure 2:
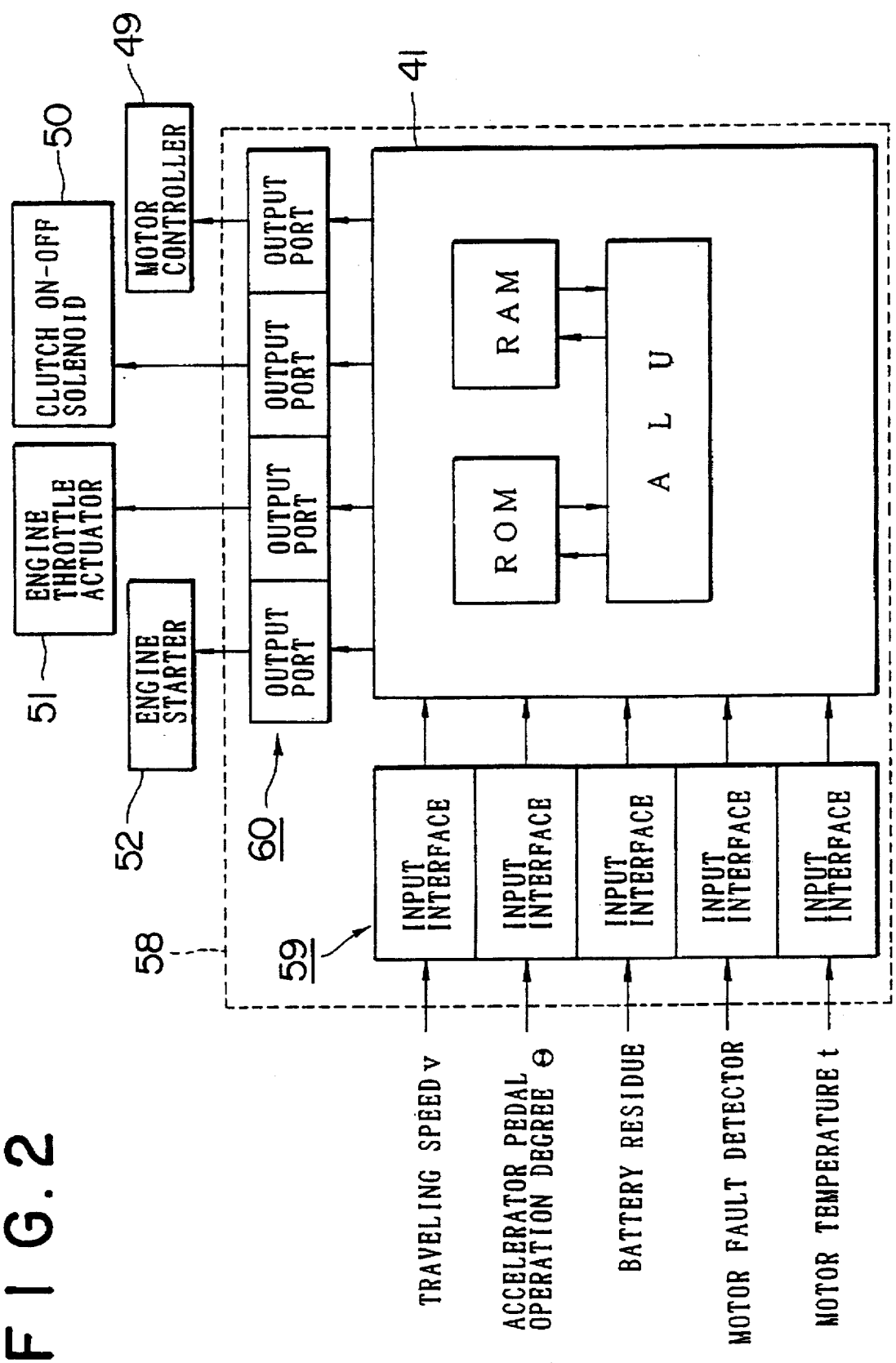
FIG. 2 is a block diagram depicting the CPU of FIG. 1.

The details of the CPU are depicted in FIG. 2. The CPU 58 includes a main unit 41 with an arithmetic logic unit (ALU), RAM and ROM, input interfaces 59 and output ports 60. Incidentally, the ROM is adapted to store the necessary drive mode maps defining running ranges for the respective drive modes. The input interfaces 59 input, to the main unit 41, data such as the travelling speed v detected by the speed sensor 44, the degree of accelerator pedal operation θ detected by the accelerator sensor 43, battery residual charge measured by a battery charge detector 55, hereinafter detailed in the second embodiment, and a confirmation of the motor state by a motor fault detector 56.

The output ports 60 are adapted to send control signals respectively to the motor controller 49, the clutch on-off solenoid 50, the engine throttle actuator 51 and the engine starter 52.

Figure 3:
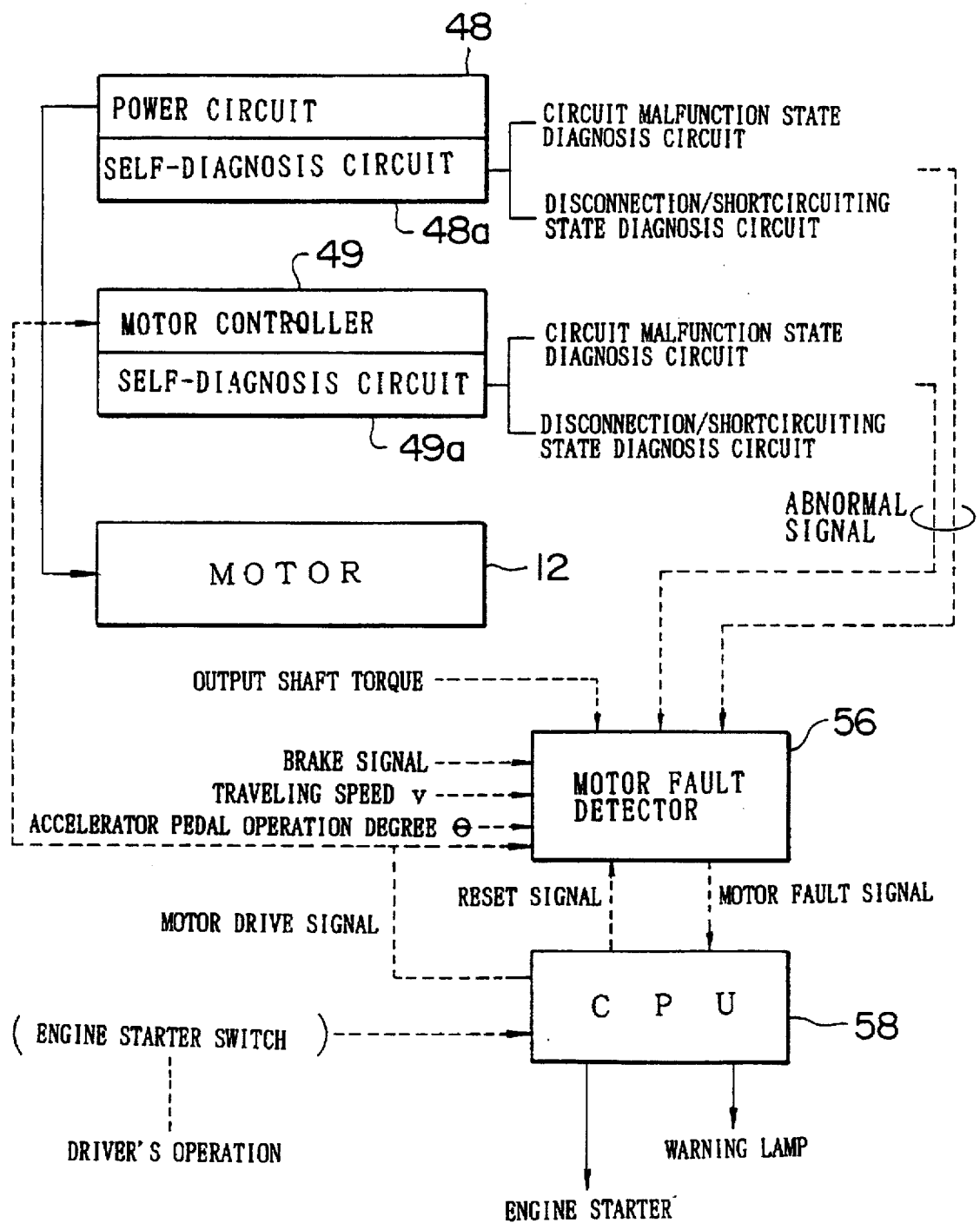
FIG. 3 is a block diagram illustrating motor fault detection.

Referring now to FIG. 3, there is shown a block diagram for the motor fault detector 56 in the above-described first embodiment.

In the drawing, the reference numeral 12 indicates the motor, 48 is the power circuit and 48a is the self-diagnosis circuit for the power circuit 48. The self-diagnosis circuit 48a comprises a circuit malfunction state diagnosis circuit and a disconnection/short-circuiting state diagnosis circuit. The reference numeral 49 indicates the motor controller and 49a is the self-diagnosis circuit for the motor controller 49. The self-diagnosis circuit 49a also comprises a circuit malfunction state diagnosis circuit and a disconnection/short-circuiting state diagnosis circuit.

It can be seen from the drawing that the motor fault detector 56 receives signals from the self-diagnosis circuit 48a indicating any unusual state of the power circuit 48 and from the self-diagnosis circuit 49a indicating any unusual state of the motor controller 49. The motor fault detector 56 is further adapted to receive signals representative of torque of the output shaft 26, brake, travelling speed v, the degree of accelerator pedal operation θ and the motor drive to thus determine whether the motor 12 is in a state of malfunction or not.

If the drive command value for the electric power to the motor 12 depending upon signals for the motor drive is D and if the preliminary set value for same is DA, the following expression is obtained. In this state, the brake pedal is not worked.

D>=DA

When comparing the actual travelling speed v with the preliminary set speed vA, the following expression is obtained as an indication that the motor 12 is in a state of malfunction.

v<vA

In a malfunction, for example, DA can be 100(%) and vA can be 1(km/h).

Furthermore, when the actual degree of accelerator pedal operation θ is compared with the predetermined value θA, the following expression can be obtained. In this state, the brake pedal is not worked.

θ>=θA may mean a malfunction of the motor 12. In an example of such a status for θA and vA, θA can be 100(%) and vA can be 1(km/h).

Otherwise, if the torque of the output shaft 26 is extremely low relatively, the driver may note a malfunction of the motor 12. When a malfunction of the motor 12 is detected, the motor fault detector 56 sends a signal to the CPU 58 to indicate that the motor 12 is out of order.

Incidentally, a state of malfunction of the motor 12 can be indicated when either the self-diagnosis circuit 48a of the power circuit 48 or the self-diagnosis circuit 49a of the motor controller 49 issues an abnormal signal or when the power circuit 48 or the motor controller 49 is out of order.

As has been mentioned above, in the first embodiment according to the present invention, the degree of accelerator pedal operation θ determines the timing for a change from the motor drive mode to the engine/motor drive mode and the travelling speed v determines the timing for a change from either the motor drive mode or the engine/motor drive mode to the engine drive mode and these timings are altered in accordance with upon the motor temperature t. In other words, in this particular embodiment, when the motor temperature t is high, the running range for the motor drive mode is reduced while the running range (operational areas) for the engine/motor drive mode and the engine drive mode are expanded.

Accordingly, in this particular embodiment, the electric power supplied to the motor 12 can be reduced if the motor temperature t is high to decrease the load on the stator coil 12b. It should be understood that a shortage of torque generated by the motor 12 is made up by a corresponding torque from the internal combustion engine 11, thus preventing excessive heating of the motor 12 and severe damage by heat to the stator coil 12b. At a preferred low temperature for the motor 12, the copper wire used in the motor does not have high electrical resistance, so that the working efficiency of the motor 12 is good for optimum travel distance on one battery charge.

The drive mode map in the first embodiment will be explained in detail with reference to FIG. 4.

When the stator coil 12b of the motor 12 or the motor temperature is normal, the vehicle according to the present invention is controlled in the motor drive mode in which the travelling speed v is lower than the predetermined changeover traveling speed v1 and the degree of accelerator pedal operation θ is also lower than the predetermined value θ1. When the travelling speed v is lower than the changeover traveling speed v1 and the degree of accelerator pedal operation θ is higher than the value θ1, the vehicle moves in the engine/motor drive mode. Only when the travelling speed v is higher than the speed v1, is the vehicle adapted to move in the engine drive mode. Incidentally, such a hysteresis regarding a mode shift among the three modes divided according to the traveling speed v and the degree of accelerator pedal operation θ is learned and stored for latter traveling.

Figure 4:
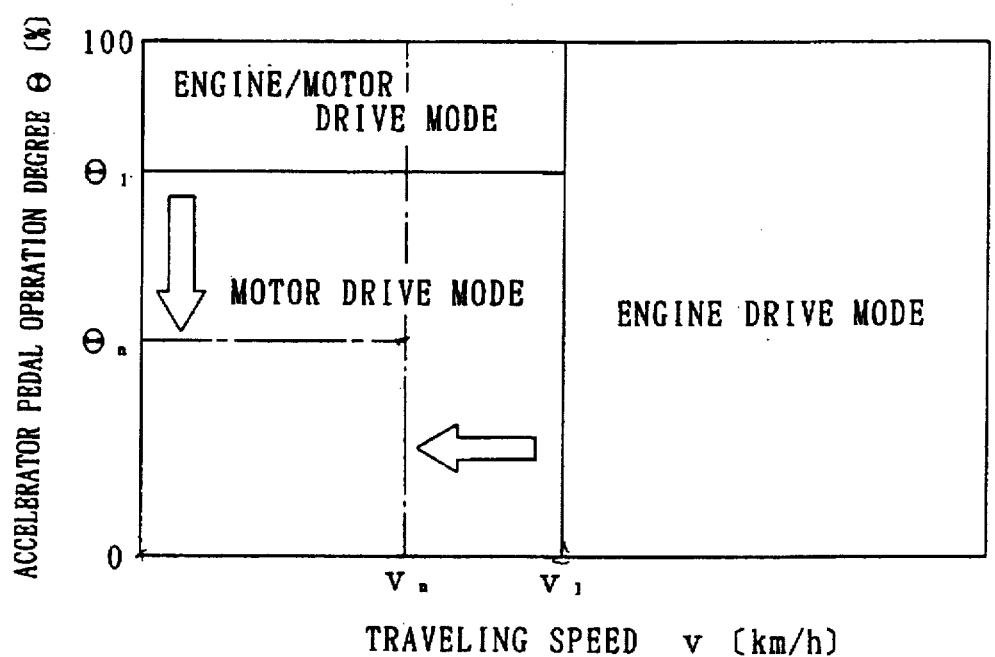
FIG. 4 is a drive mode map which may be used in the first embodiment.

But, once the motor temperature t becomes high, the degree of accelerator pedal operation θ1 is changed to another degree θn as a changeover degree of accelerator pedal operation (θ1>θn) and the changeover traveling speed v1 is also changed to a speed vn (v1<vn), as shown in FIG. 4.

Accordingly, when the motor temperature t is high, when the traveling speed v is lower than the changeover travelling speed vn and when the degree of accelerator pedal operation θ is lower than the predetermined changeover degree of accelerator pedal operation θn, the vehicle moves in the motor drive mode. When the speed v is lower than the speed vn and the degree θ is larger than the degree θn, the vehicle moves in the engine/motor drive mode. Only when the speed v is higher than the changeover traveling speed vn, does the vehicle move in the engine drive mode.

Figure 5:
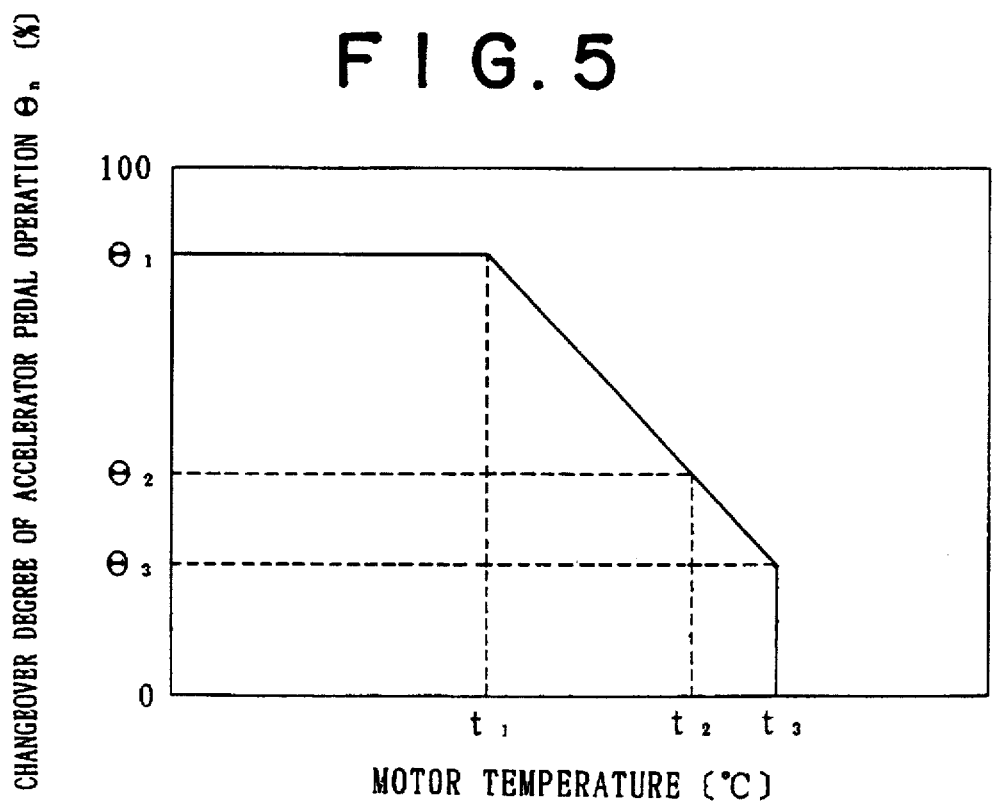
FIG. 5 is a graphical representation showing the relationship between motor temperature and accelerator pedal operation in the first embodiment.
Figure 6:
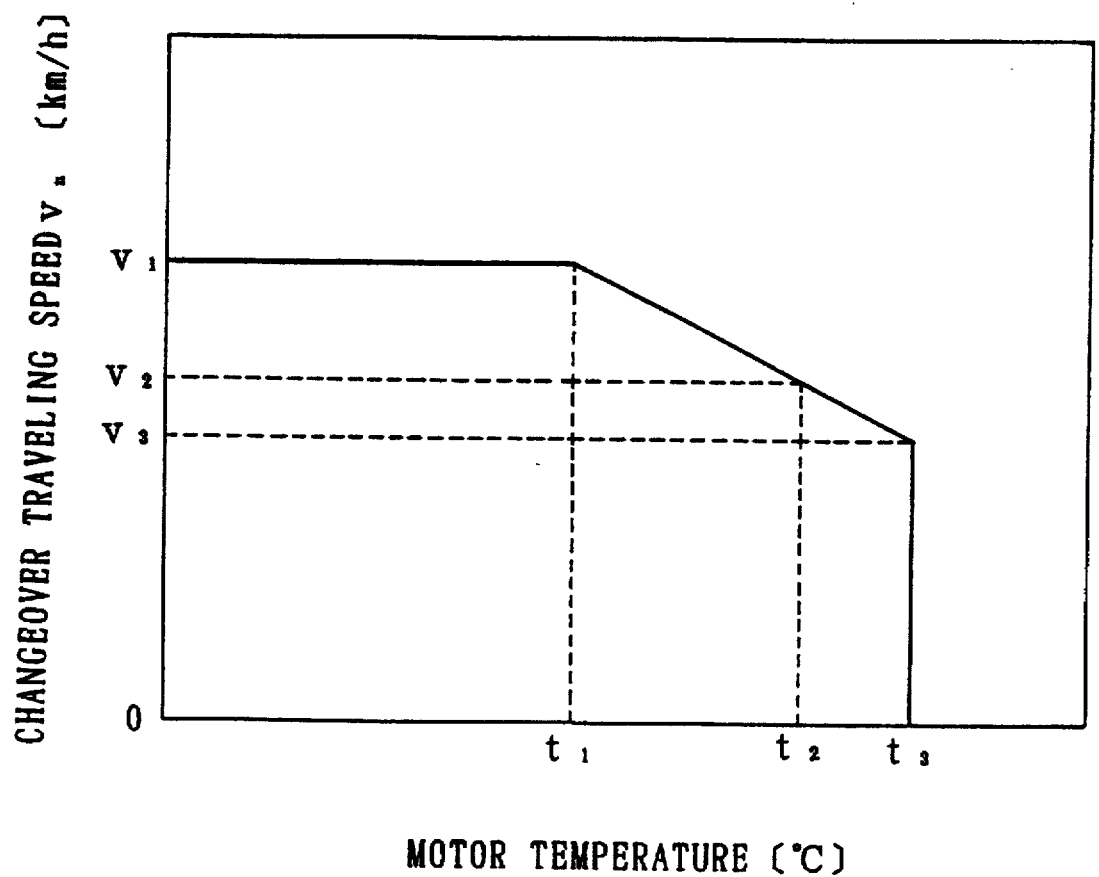
FIG. 6 is a graphical representation showing the relationship between motor temperature and changeover traveling speed in the first embodiment.

FIG. 5 is a graphical representation showing a relationship between the motor temperature and the changeover degree of accelerator pedal operation in the first embodiment. FIG. 6 is a graphical representation showing a relation between the motor temperature and the changeover traveling speed in the same embodiment. It will be noted from the drawing that the higher the motor temperature tn, the lower both the changeover degree of accelerator pedal operation θn and the changeover traveling speed vn are set. Such a setting is stored in the CPU 58, specifically in the ROM.

More specifically, when the motor temperature t1 reaches 20 degrees, the changeover degree of accelerator pedal operation θ1 is set at 80(%) as a preferred value to start and accelerate the vehicle and the changeover travelling speed v1 is set at 80 (km/h) so as to move comfortably on the road. As the motor temperature t2 reaches 80 degrees, the changeover degree of accelerator pedal operation θ2 is set at 50(%) and the changeover traveling speed v2 is set at 70 (km/h). If the motor temperature t3 exceeds 100 degrees, both the changeover degree of accelerator pedal operation θ3 and the changeover traveling speed v3 are set at 0 (zero).

Incidentally, in the description of the following second embodiment, the same reference numerals will be used to designate the same or similar components as those in the first embodiment, so that the description will be simplified.

In this particular embodiment, the CPU 58 is adapted to expand the running ranges for the engine drive mode to comply with the detected battery residual charge. In order to provide such a function, a battery residual charge detector 55 is located intermediate the battery 47 and the CPU 58 as shown in FIG. 1.

Figure 7:
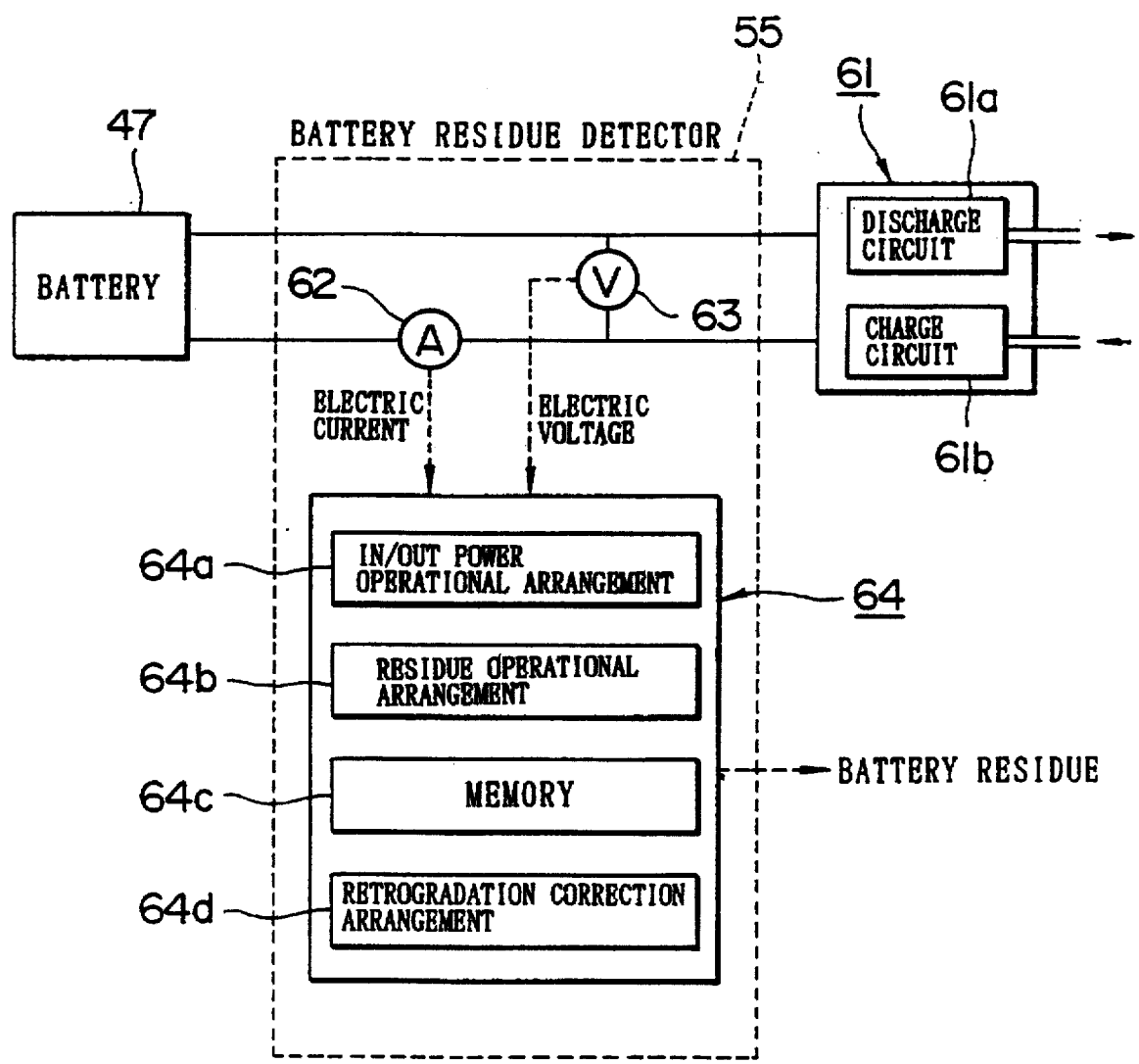
FIG. 7 is a block diagram showing a battery residual charge detector system.

Referring now to FIG. 7, it depicts a block diagram showing the overall system of the battery residual charge detector 55 used in the hybrid vehicle according to the present invention.

In the drawing, the reference numeral 47 indicates a battery, 55 is the battery residual charge detector, 61 is a circuit for charging and discharging, 61a is a discharge circuit and 61b is a charge circuit. There are provided an ammeter 62 and a voltmeter 63 between the battery 47 and the circuit for charging and discharging 61 to confirm input and output electric power, thus detecting the residual battery charge. Such detection is done in a control unit 64 comprising an in/out power operational arrangement 64a, a residual charge operational arrangement 64b, a memory 64c and a retrogradation correction arrangement 64d.

Figure 8:
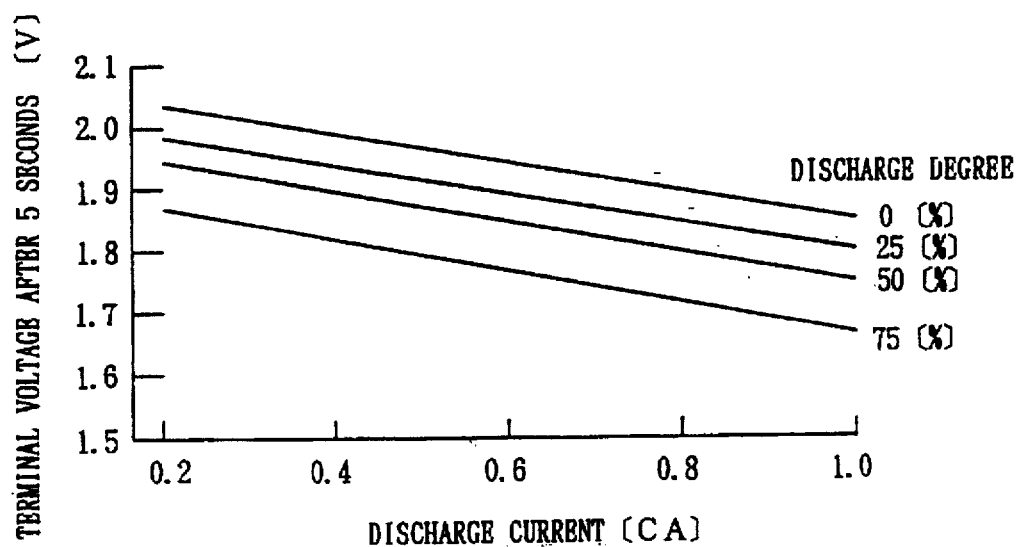
FIG. 8 is a graphical representation showing the relationship between discharge current, terminal voltage after 5 seconds and the battery residual charge.
Figure 9:
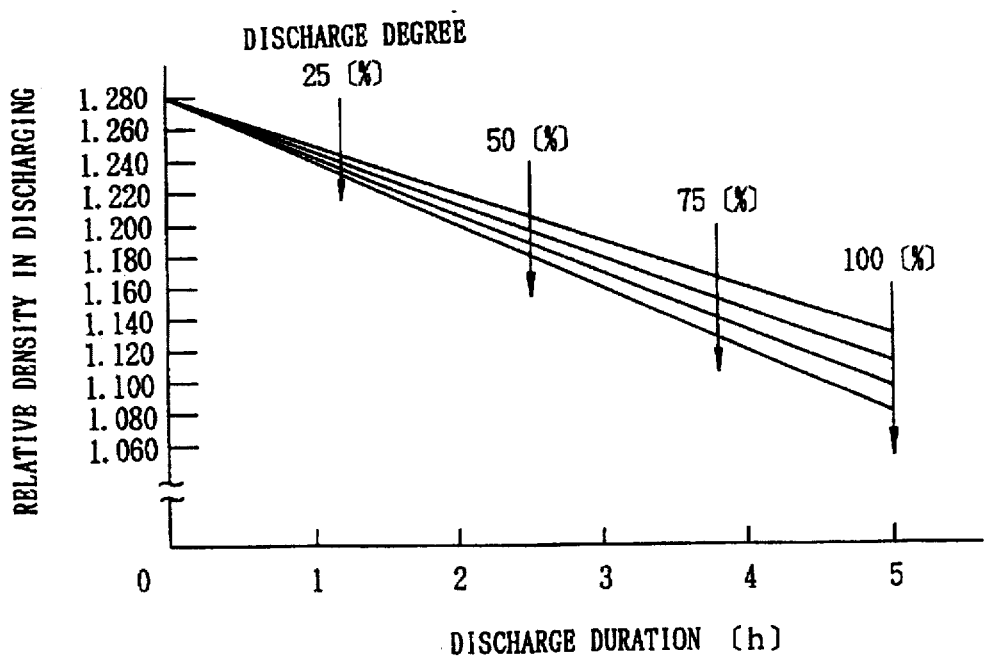
FIG. 9 is a graphical representation showing the relationship between discharge duration and relative density in discharging.

It should be understood that the residual battery charge can be detected by other measures by utilizing the graphical representations shown in FIGS. 8 and 9.

FIG. 8 is a graphical representation of a relationship between discharge current and terminal voltage after 5 seconds for detection of the battery residual charge. FIG. 9 is a graphical representation showing the relationship between discharge duration and relative density in discharging.

As can be seen from FIG. 8, as the battery residual charge is decreased, the terminal voltage of the battery 47 drops. The degree of discharge of the battery can be measured by detecting the terminal voltage after 5 seconds to thereby determine the actual residual battery charge.

In FIG. 9, as the residual battery charge is decreased, specific gravity of the electrolyte used in the battery 47 decreases. Therefore, the degree of discharge of the battery can be measured as a change of the specific gravity to thereby determine the present residual battery charge. It is also possible to utilize both measures shown in FIGS. 8 and 9 to measure the battery residual charge.

Once the actual battery residual charge is determined, the battery residual charge detector 55 outputs the corresponding signal to the CPU 58.

Figure 10:
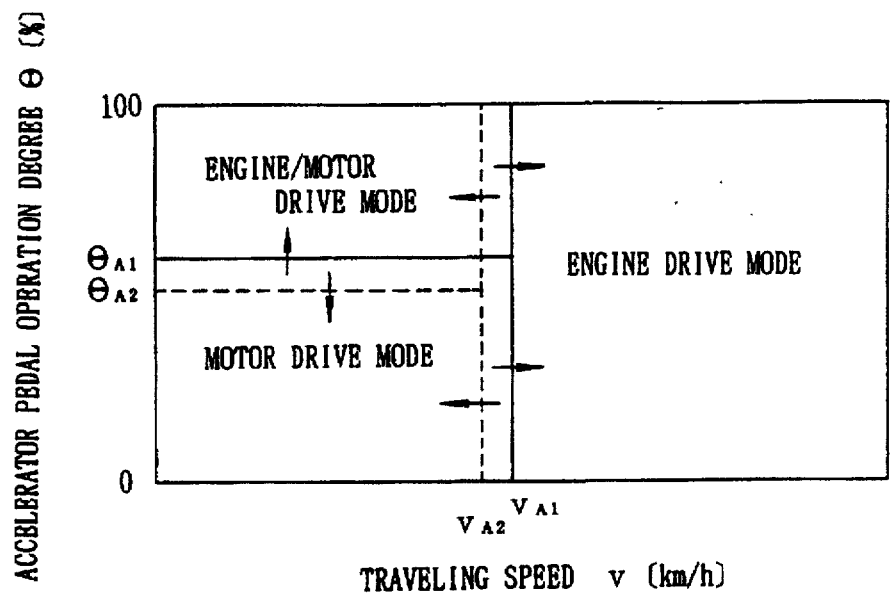
FIG. 10 depicts a first drive mode map utilized when the motor drive assembly is in good order.
Figure 11:
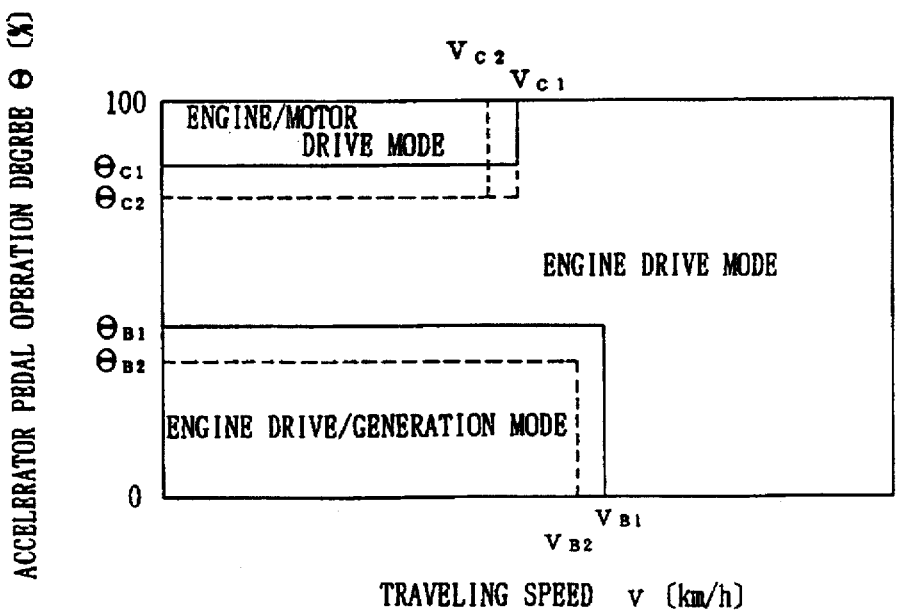
FIG. 11 depicts a second drive mode map.
Figure 12:
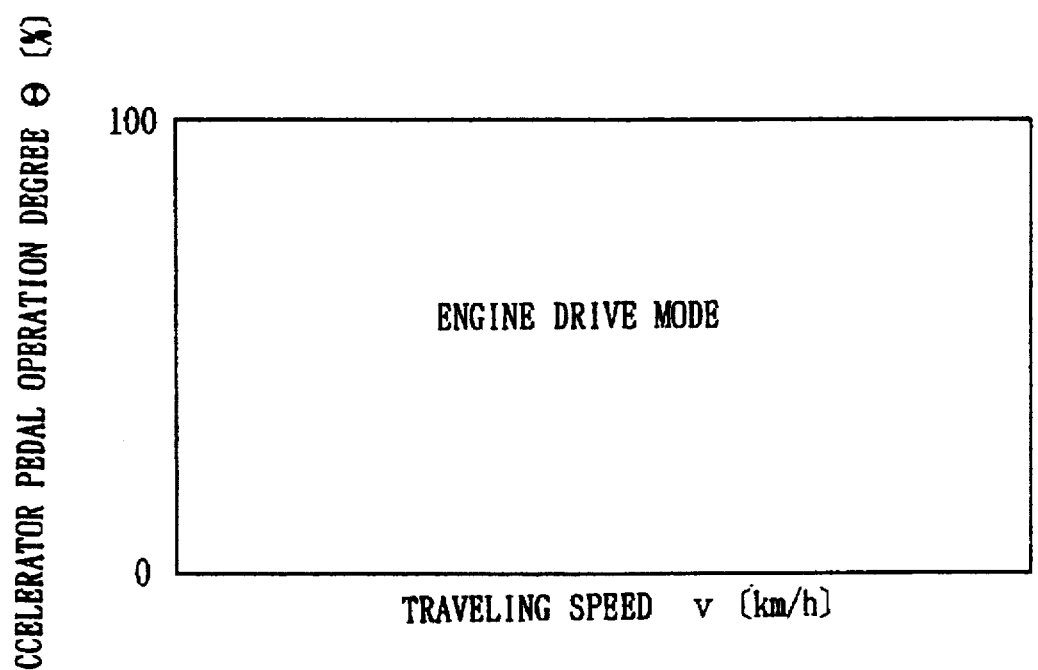
FIG. 12 depicts a third drive mode map.

The CPU 58 is adapted to receive signals representing the battery residual charge and a malfunction of the battery and then change the drive mode maps as explained in connection with the first embodiment so as to expand the running sphere range for the engine drive mode. The CPU 58 retains, in the ROM, the first drive mode map as depicted in FIGS. 10–12, the second drive mode map and the third drive mode map. The CPU 58 can notify the driver of a malfunction of the motor by means of a warning lump. Generally, the expansion of the running range for the engine drive mode is conducted by the CPU 58 responsive to the detected travelling speed v and the degree of accelerator pedal operation θ the engine starter 52 is then automatically operated. The internal combustion engine may also be manually started by the driver utilizing the starter 52. When such an alteration of the drive mode maps is completed, the motor fault detector 56 is reset by a signal from the CPU 58.

FIG. 10 is the first drive mode map utilized when the motor drive assembly is in good order. In this mode, as the travelling speed v is lower than the changeover traveling speeds vA1, vA2 and the degree of accelerator pedal operation θ is lower than the changeover values for accelerator pedal operation θA1, θA2, the vehicle moves in the motor drive mode. When the traveling speed v is lower than the speeds vA1, vA2 and the degree of accelerator pedal operation θ is higher than the changeover values for accelerator pedal operation θA1, θA2, the vehicle moves in the engine/motor drive mode. And when the speed v is higher than vA1, vA2, the vehicle moves in the engine drive mode.

The preliminary learned hysteresis regarding the traveling speed v and the degree of accelerator pedal operation θ for changing the mode is used for setting the changeover traveling speeds vA1, vA2 and the changeover degree of accelerator pedal operation values θA1, θA2.

More particularly, the changeover traveling speed vA1 is set at 80 (km/h) and the speed vA2 is set at 70 (km/h) for smooth driving. Furthermore, the changeover value for degree of accelerator pedal operation θA1 is set at 80% and the degree θA2 is set at 60% so as to begin to move the vehicle in the motor drive mode.

As has been described above, the motor drive mode is used when the vehicle which moves slowly and does not have much load, the engine/motor drive mode is used when the vehicle moves slowly under a large load, and the engine drive mode is used for driving the vehicle at high speed.

Referring now to the second drive mode map shown in FIG. 11, the running area for the occupied by the engine drive mode is expanded when the battery residual charge becomes low that is, lower than 60% preferably 50–70%. In this mode map, when the travelling speed v becomes lower than the changeover traveling speed vB1, vB2 and the degree of accelerator pedal operation degree θ is lower than the changeover degree of accelerator pedal operation θB1, θB2, the vehicle moves in the engine drive/generation mode; when the speed v is lower than the speed vC1, vC2 and the degree of accelerator pedal operation θ is higher than the degree of accelerator pedal operation changeover θC1, θC2, the vehicle moves in the engine/motor drive mode; and, in the remaining running area, the vehicle moves in the engine drive mode. Incidentally, throughout the mode changes, the hysteresis is learned from the traveling speed v and the accelerator pedal operation degree θ.

The degree of accelerator pedal operation changeover points θB1, θB2 could be set at 0% and the θC1, θC2 could be set at 100% when conserving electrical power of the battery.

In the engine drive/generation mode, the engine 11 is operated and the motor 12 is rotated by torque generated by the engine 11 to generate electricity. As noted above, the engine drive/generation mode is used for moving the vehicle slowly and under low load, the engine/motor drive mode is used to move the vehicle slowly under high load, and the engine drive mode is used to move the vehicle slowly under normal load.

If the motor 12 malfunctions, the running area occupied by the engine drive mode is further expanded as shown in FIG. 12 as the third mode map, wherein the hybrid vehicle always moves in the engine drive mode at any traveling speed v and at any degree of accelerator pedal operation θ.

As the motor drive assembly gets into trouble, the running area for the engine drive mode is expanded but if the vehicle is at 0 (zero) or slow speed, even though the engine 11 is started it will be difficult for the vehicle to start in motion or accelerate by means of only the torque from the engine 11.

The torque convertor 15, provided between the engine 11 and the clutch C, amplifies the torque generated by the engine. Accordingly, whenever the motor drive assembly develops a problem, the vehicle can be moved by the engine in the engine drive mode without slipping of the clutch C.

The torque convertor 15 also functions to change the output characteristic of the engine 11 to that of the motor 12 thus providing smooth cruising of the vehicle. In addition, vibration and fluctuation of the engine 11 do not directly influence the motor 12, so that durability and reliance of the motor 12 are achieved and electrical noise by switching in the motor controller 49 is prevented.

An oil cooling system for the torque convertor 15, or a circulation pump, a pressure regulation valve and a cooler (not shown) can also operate as a cooling system for the motor 12, thus achieving a further reduction in weight and cost. If necessary, the hydraulic power transmission, such as provided by the torque convertor 15, can be omitted by using a fluid coupling.

Figure 14:
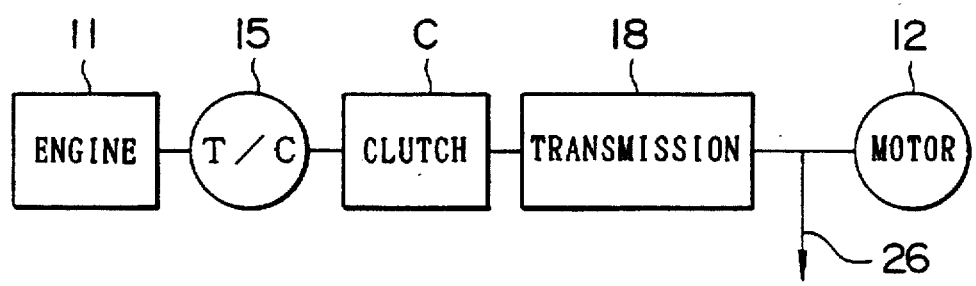
FIG. 14 depicts a power train system with a transmission unit.
Figure 15:
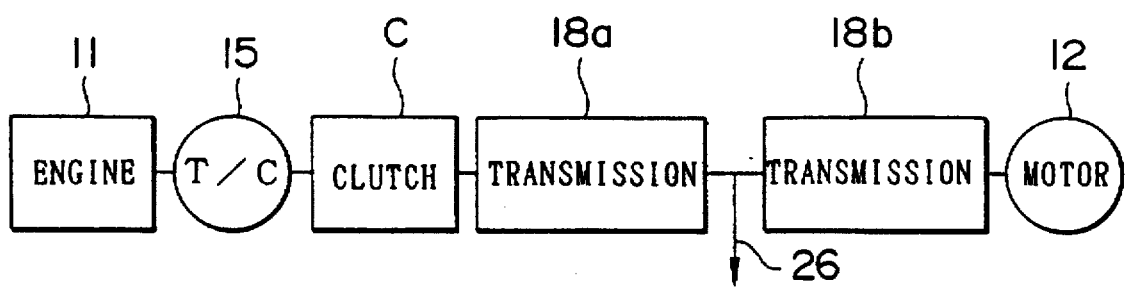
FIG. 15 depicts a power train system with two transmission units.
Figure 16:
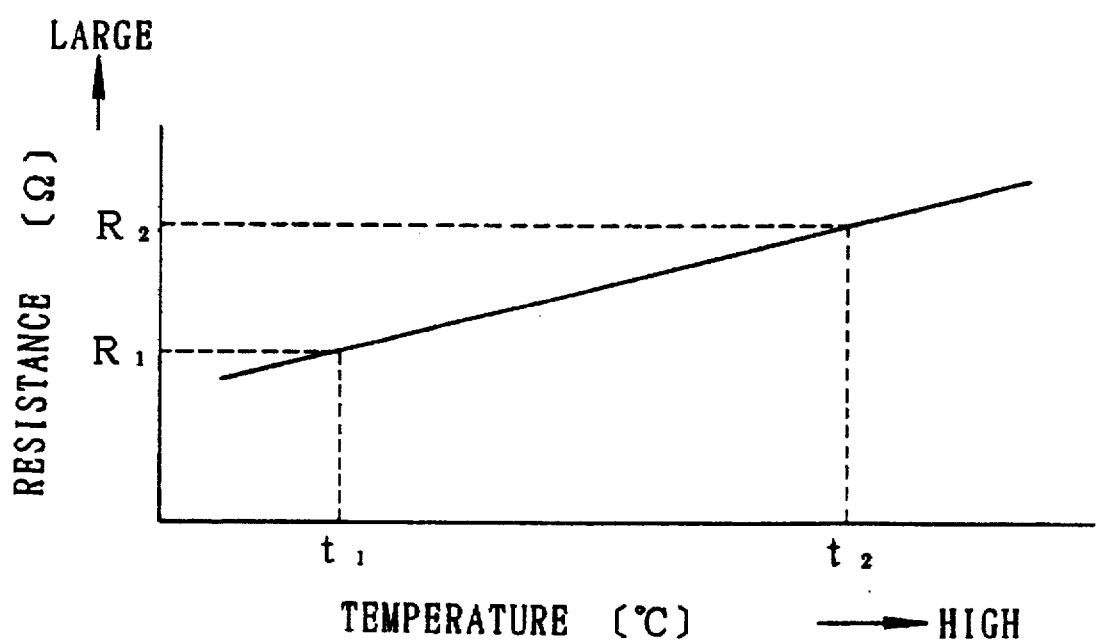
FIG. 16 is a graphical representation of a correlation between temperature and electrical resistance in copper wire.

Several preferred power train systems for use in the present invention will now be explained with reference to FIGS. 13, 14 and 15. In these drawings, the reference numeral 11 indicates the engine, 12 is the motor, 15 is the torque convertor (T/C), C is the clutch, 18 is the transmission unit, 18a is the first transmission, 18b is the second transmission, and 26 is the output axle.

Figure 13:
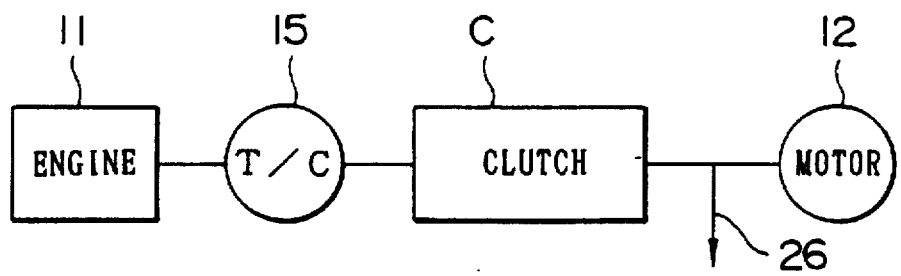
FIG. 13 depicts a power train system without a transmission unit.

In the system described in FIG. 13, both the engine 11 and the motor 12 outputs are transmitted to the output axle without any gear change. In the system in FIG. 14 used in the first embodiment, the rotation of the engine 11 is converted in the transmission unit 18 while that of the motor 12 is directly transmitted to the output axle 26 without any gear change. In FIG. 15, the rotational output of the engine 11 is converted in the first transmission 18a, that of the motor 12 is converted in the second transmission 18b and thereafter these rotational outputs are combined and transmitted to the output axle 26.

What is claimed is:

1. A hybrid vehicle comprising:
   speed detection means for detecting vehicle speed;
   accelerator detection means for detecting degree of accelerator pedal depression;
   an internal combustion engine;
   a motor drive assembly including an electric motor, a motor controller, a battery and a power source circuit for sending electric current from said battery to the motor, the electric motor having its output connected to an output shaft;
   clutch means which is engagable for selectively connecting the internal combustion engine to the output shaft;
   a hydraulic power transmission provided between said clutch means and the internal combustion engine;
   malfunction detecting means for detecting a malfunction in any one of said electric motor, said motor controller and said power source circuit, said malfunction detecting means monitoring a vehicle operation parameter relating to operation of said electric motor, said motor controller, or said power source circuit, a malfunction being detected when the monitored parameter crosses a predetermined value;
   drive power share computing means for apportioning drive power for the vehicle between the engine and the motor to establish one of the following three normal drive modes: (1) an engine drive mode wherein the vehicle is driven by the engine alone, responsive to detection of a vehicle speed exceeding a set value for speed, (2) a motor drive mode wherein the vehicle is driven by the motor alone, responsive to detection of a vehicle speed below the set value for speed and of a degree of accelerator depression below a set value for degree of accelerator depression and (3) a hybrid drive mode wherein the vehicle is driven by the engine and the motor in combination, responsive to detection of a vehicle speed below the set value for speed and of a degree of accelerator depression above the set value for degree of accelerator depression and for changing said set values responsive to changes in a detected vehicle operation parameter;

first control means for disengaging said clutch means when the vehicle is driven by the motor alone; and second control means for engaging said clutch means and for establishing a malfunction drive mode wherein the vehicle is driven by the engine alone, regardless of the detected vehicle speed and detected degree of accelerator depression, responsive to a detection of a malfunction by said malfunction detecting means.

2. The hybrid vehicle according to claim 1, further comprising third control means for interrupting operation of the motor when said malfunction detecting means detects a malfunction.

3. The hybrid vehicle according to claim 1, wherein said malfunction detecting means detects a malfunction originating in the motor.

4. The hybrid vehicle according to claim 1, further comprising a transmission unit between the motor and the output shaft.

5. The hybrid vehicle according to claim 1, wherein said hydraulic power transmission is a torque convertor including a pump impeller, a turbine runner and a stator.

6. The hybrid vehicle according to claim 5, wherein said hydraulic power transmission further comprises a lock-up clutch for effecting a direct connection between input and output shafts of said torque converter.

7. The hybrid vehicle according to claim 1 wherein said drive power share computing means includes a memory containing at least one stored map of values for travelling speed correlated with values for degree of throttle opening, said map divided by boundary lines into areas for the three driving modes, said drive power share computing means selecting one of said three driving modes by applying the detected degree of throttle opening and the detected travelling speed to said map.

8. The hybrid vehicle according to claim 7 further comprising temperature detection means for detecting temperature of the motor and wherein said detected vehicle operation parameter is the detected temperature.

9. The hybrid vehicle according to claim 1 wherein said malfunction detecting means compares the detected vehicle speed with a vehicle speed set for said electric motor by said motor controller, a detected vehicle speed lower than said set vehicle speed being taken as a malfunction.

10. The hybrid vehicle according to claim 1 wherein said malfunction detection means comprises temperature detection means for detecting temperature of the motor and wherein a malfunction is signaled when the temperature detected by said temperature detection means reaches a predetermined temperature.

11. The hybrid vehicle according to claim 1 wherein said malfunction detection means comprises a self-diagnosis circuit incorporated into said power source circuit for self-diagnosis of said power source circuit.

12. The hybrid vehicle according to claim 1 wherein said malfunction detection means comprises a self-diagnosis circuit for carrying out self-diagnosis of the motor controller.

13. The hybrid vehicle according to claim 1 further comprising:

means for detecting braking of the vehicle;

and wherein the malfunction is detected when a detected degree of accelerator pedal depression is greater than a predetermined value for degree of accelerator pedal depression, when the braking of the vehicle is not detected, and when the detected vehicle speed is lower than a predetermined vehicle speed.

14. A hybrid vehicle comprising:

speed detection means for detecting vehicle speed;

accelerator detection means for detecting degree of accelerator pedal depression;

an internal combustion engine;

a motor drive assembly including an electric motor, a motor controller, a battery and a power source circuit for sending electric current from said battery to the motor, the electric motor having its output connected to an output shaft;

a temperature sensor for detecting temperature of said motor, said motor controller reducing electric power to said motor responsive to detection of a predetermined increase in said temperature;

clutch means which is engagable for selectively connecting the internal combustion engine to the output shaft;

a hydraulic power transmission provided between said clutch and the internal combustion engine;

malfunction detecting means for monitoring a parameter relating to operation of said electric motor, said motor controller or said power source circuit and for determining a malfunction when said monitored parameter crosses a predetermined value;

drive power share computing means for apportioning drive power for the vehicle between the engine and the motor to establish one of the following three normal drive modes: (1) an engine drive mode wherein the vehicle is driven by the engine alone, responsive to detection of a vehicle speed exceeding a set value for speed, (2) a motor drive mode wherein the vehicle is driven by the motor alone, responsive to detection of a vehicle speed below the set value for speed and of a degree of accelerator depression below a set value for degree of accelerator depression and (3) a hybrid drive mode wherein the vehicle is driven by the engine and the motor in combination, responsive to detection of a vehicle speed below the set value for speed and of a degree of accelerator depression above the set value for degree of accelerator depression and for lowering said set value for speed and said set value for degree of accelerator depression responsive to detection of an increase in temperature of said motor;

first control means for disengaging said clutch means when the vehicle is driven by the motor alone; and second control means for engaging said clutch means and for establishing a malfunction drive mode wherein the vehicle is driven by the engine alone, regardless of the detected vehicle speed and detected degree of accelerator depression, responsive to a detection of a malfunction by said malfunction detecting means.

15. The hybrid vehicle according to claim 14, further comprising third control means for interrupting operation of the motor when said malfunction detecting means detects a malfunction.

16. The hybrid vehicle according to claim 14, wherein said malfunction detecting means detects a malfunction originating in the motor.

17. The hybrid vehicle according to claim 14, further comprising a transmission unit between the motor and the output shaft.

18. The hybrid vehicle according to claim 14, wherein said hydraulic power transmission is a torque converter including a pump impeller, a turbine runner and a stator.

19. The hybrid vehicle according to claim 14, further comprising means for detecting battery residual charge and for generating a signal for the detected residual battery charge as an input to said drive power share computing means, said drive power share computing means changing said set values responsive to said signal representative of residual battery charge.

20. The hybrid vehicle according to claim 14 wherein said malfunction detection means signals a malfunction when the temperature detected by said temperature sensor reaches a predetermined temperature.

21. The hybrid vehicle according to claim 14 wherein said malfunction detection means comprises a self-diagnosis circuit incorporated into said power source circuit for self-diagnosis of said power source circuit.

22. The hybrid vehicle according to claim 14 wherein said malfunction detection means comprises a self-diagnosis circuit for carrying out self-diagnosis of the motor controller.

* * * * *

UNITED STATES PATENT AND TRADEMARK OFFICE
CERTIFICATE OF CORRECTION

PATENT NO.  : 5,697,466
DATED       : December 16, 1997
INVENTOR(S) : MOROTO et al It is certified that error appears in the above-indentified patent and that said Letters Patent is hereby corrected as shown below:

Col. 7, line 29, ">" should read --<--.

Col. 9, line 2, "0" should read --$\theta$--;
      line 3, "0A1, 0A2" should read --$\theta A1, \theta A2$--;
      line 10, "0A1, 0A2" should read --$\theta A1, \theta A2$--; and
      line 14, "0A1" should read --$\theta A1$--.

Signed and Sealed this

Thirteenth Day of October 1998

Attest:

BRUCE LEHMAN

*Attesting Officer*      *Commissioner of Patents and Trademarks*